UNITED STATES PATENT OFFICE.

JOANNA B. TRIBBLE, OF MIDDLEBOROUGH, MASSACHUSETTS.

IMPROVED COMPOSITION FOR PREVENTING DISEASE IN VEGETABLES.

Specification forming part of Letters Patent No. 46,957, dated March 21, 1865.

*To all whom it may concern:*

Be it known that I, JOANNA BISBEE TRIBBLE, of Middleborough, of the county of Plymouth and State of Massachusetts, have invented a new and useful Composition for the Prevention of the Vegetable Disease termed "Potato-Rot;" and I do hereby declare the same to be described as follows:

The constituents of the said composition sufficient for about one acre of land are three pecks of wood-ashes, two pecks of slaked lime, one peck of sulphur, and one peck of chloride of sodium, or common Liverpool salt. These articles, after being powdered or reduced to a powdered state, are to be well mixed together, after which the composition will be ready for use.

In using the said composition it should be sown on the land as grain is usually sown, and at three different periods of two weeks each before planting the potatoes on such land. After each sowing of the composition it should be harrowed into or otherwise properly incorporated with the soil.

Experience has proved the great utility of this composition, as where it has been used it has been rare to find a potato effected with the rot, whereas in adjacent fields or patches not previously prepared with the composition the disease has prevailed to a very large extent and been occasions of serious loss to their owners.

In order to test the utility of each of the ingredients of the composition, it has been separately tested without producing the effect which results from the composition itself. So each ingredient has been combined or mixed with two of the others, but on trial of the mixture the rot was not prevented. It is only when the several constituents are mixed together that a good practical result will follow from the use of the composition. The undersigned does not pretend to explain the reasons why this result follows from the employment of the composition in the manner as above explained. She knows that repeated and practical experiments by her made on a large scale with it have fully demonstrated its value and proved to be a powerful preventive of potato-rot.

I claim as my invention—

The said composition, made and for the use substantially as specified.

JOANNA B. TRIBBLE.

Witnesses:
 R. H. EDDY,
 OBEDIAH FORD.